United States Patent
Crutchley (10) Patent No.: US 8,944,711 B2
(45) Date of Patent: Feb. 3, 2015

(54) BOTTLE, ESPECIALLY FOR MASCARA, COMPRISING A LABEL HAVING BARRIER PROPERTIES, AND PRODUCTION METHOD

(75) Inventor: Edward Brooke Crutchley, Kent (GB)

(73) Assignee: Albea Services, Gennevilliers (FR)

( * ) Notice: Subject to any disclaimer, the term of this patent is extended or adjusted under 35 U.S.C. 154(b) by 1121 days.

(21) Appl. No.: 12/682,987

(22) PCT Filed: Oct. 24, 2008

(86) PCT No.: PCT/FR2008/001505
§ 371 (c)(1),
(2), (4) Date: Apr. 14, 2010

(87) PCT Pub. No.: WO2009/092878
PCT Pub. Date: Jul. 30, 2009

(65) Prior Publication Data
US 2010/0226705 A1 Sep. 9, 2010

(30) Foreign Application Priority Data
Oct. 26, 2007 (FR) .................................... 07 07537

(51) Int. Cl.
*A46B 11/00* (2006.01)
*B29C 45/06* (2006.01)
*B29C 45/14* (2006.01)
(Continued)

(52) U.S. Cl.
CPC ......... *B29C 45/062* (2013.01); *B29C 45/14008* (2013.01); *B29C 45/14811* (2013.01); *B29C 2045/14049* (2013.01); *B29C 2045/14057* (2013.01); *B29C 2045/14852* (2013.01); *B29C 2045/14918* (2013.01); *B29K 2705/00* (2013.01); *B29K 2995/0067* (2013.01); *B29L 2031/712* (2013.01)

USPC .......................................... 401/126; 401/122

(58) Field of Classification Search
USPC ........... 401/122, 126; 283/81; 428/35.9, 36.6, 428/36.7
See application file for complete search history.

(56) References Cited

U.S. PATENT DOCUMENTS 3,039,648 A * 6/1962 Busch ..................... 252/62.51 R
3,172,571 A    3/1965 Marchak
3,756,731 A * 9/1973 Aubry .......................... 401/122
(Continued)

FOREIGN PATENT DOCUMENTS

JP    2009141180 A    6/1997
JP    2006056559 A    3/2006
(Continued)

OTHER PUBLICATIONS

MatWeb.com Material property data for BAREX 210, http://www.matweb.com/search/datasheet.aspx?matguid=da7f39ce41554e7d873a6fdbf6d3f0b0&ckck=1, Retreived on Oct. 18, 2013.*
(Continued)

*Primary Examiner* — David Walczak
*Assistant Examiner* — Bradley Oliver
(74) *Attorney, Agent, or Firm* — Banner & Witcoff, Ltd.

(57) ABSTRACT

Bottle (101) for a cosmetic product containing a volatile solvent, especially for mascara, comprising an opening (106) and a rigid side wall (103) produced as a plastic molding having an inside lateral surface in contact with said cosmetic product and an outside lateral surface (104) to which a label (100) is affixed, said label having barrier properties with regard to the volatile solvent. This label advantageously covers the entire outside lateral surface.

31 Claims, 6 Drawing Sheets

(51) Int. Cl.
*B29K 705/00* (2006.01)
*B29L 31/00* (2006.01)

(56) References Cited

U.S. PATENT DOCUMENTS

| | | | |
|---|---|---|---|
| 4,921,366 A * | 5/1990 | Hurrell .......................... 401/126 |
| 5,141,347 A | 8/1992 | Fitjer |
| 6,276,856 B1 * | 8/2001 | Pieper et al. ................... 401/129 |
| 6,523,548 B2 * | 2/2003 | Bouix et al. ................... 132/218 |
| 6,572,296 B2 * | 6/2003 | Schrepf ......................... 401/122 |
| 6,670,007 B1 * | 12/2003 | Safian et al. ............... 428/36.91 |
| 7,325,993 B2 * | 2/2008 | Gueret .......................... 401/202 |
| 7,398,898 B2 * | 7/2008 | Bouix et al. ................... 222/183 |
| 7,807,270 B2 * | 10/2010 | Share et al. ................. 428/474.4 |
| 7,972,073 B2 * | 7/2011 | Vintimiglia ................... 401/129 |
| 8,632,101 B2 * | 1/2014 | Mallol et al. .................... 283/81 |
| 8,642,145 B2 * | 2/2014 | Bower et al. ................. 428/35.8 |
| 8,703,265 B2 * | 4/2014 | Thorstensen-Woll et al. ............................. 428/66.4 |
| 2003/0063942 A1 * | 4/2003 | Gardner et al. ................. 401/16 |
| 2003/0091769 A1 * | 5/2003 | Slat et al. .................... 428/35.7 |
| 2007/0166494 A1 * | 7/2007 | Bergsmann et al. ......... 428/35.9 |
| 2008/0116213 A1 * | 5/2008 | Schlaupitz et al. ........... 220/694 |
| 2009/0067913 A1 * | 3/2009 | Vintimiglia ................... 401/129 |
| 2009/0214285 A1 * | 8/2009 | Cho ............................... 401/126 |
| 2011/0274796 A1 * | 11/2011 | Bower et al. ................... 426/243 |
| 2012/0082810 A1 * | 4/2012 | Hutchinson et al. ......... 428/36.6 |
| 2012/0256356 A1 * | 10/2012 | Akiyama et al. .............. 264/515 |
| 2013/0302591 A1 * | 11/2013 | Timmerman et al. ...... 428/319.9 |
| 2014/0170344 A1 * | 6/2014 | Pramanik et al. ............ 428/34.5 |
| 2014/0186561 A1 * | 7/2014 | Bhattacharya et al. ...... 428/35.9 |

FOREIGN PATENT DOCUMENTS

| | | |
|---|---|---|
| KR | 20060035625 A | 4/2006 |
| WO | 2006027227 A | 3/2006 |
| WO | 2007036302 A | 4/2007 |

OTHER PUBLICATIONS

MatWeb.com Material property data for HDPE, http://www.matweb.com/search/DataSheet.aspx?MatGUID=af3d832d12b64e0ea1c0657208ae5b87, Retreived on Oct. 18, 2013.*
International Search Report dated Sep. 14, 2009.

* cited by examiner

BOTTLE, ESPECIALLY FOR MASCARA, COMPRISING A LABEL HAVING BARRIER PROPERTIES, AND PRODUCTION METHOD

CROSS-REFERENCE TO RELATED APPLICATIONS

This application is a U.S. National Stage application under 35 U.S.C. §371 of International Application No. PCT/FR2008/001505 (published as WO 2009/092878 A3), filed Oct. 24, 2008, which claims priority to French Application No. 0707537, filed Oct. 26, 2007. Each of these prior applications is incorporated by reference in its entirety.

The present application claims the priority of the French application No. 0707537 filed on Oct. 26, 2007, the content of which is incorporated by reference into the present application.

TECHNICAL FIELD

The invention relates to a bottle for a cosmetic product containing at least one volatile solvent and more particularly a bottle for mascara. The invention also relates to a distributor/applicator of mascara.

STATE OF THE ART

Such a bottle commonly comprises an aperture and a rigid lateral wall molded in a plastic material or polymer comprising an inside lateral surface in contact with the cosmetic product and an outside lateral surface on which a label is affixed.

Plastic material is preferred to metal or to glass for making mascara bottles because it is lightweight, does not break, has relatively low cost and is easy to use for industrial manufacturing. Also, the mascara bottles are today molded by injection-blowing or by extrusion-blowing so as to obtain bottles including both a lateral wall, an integrated neck and bottom. With blowing it is possible to obtain a solid bottom and a neck including an aperture with a diameter of less than the diameter of the lateral wall in order to receive a wiper for a mascara applicator. The advantage of such moldings by blowing as compared for example with injection-molding is that it is not necessary to attach a separate end, i.e. a bottom and/or a neck, onto the lateral wall, in order to form the bottle.

With increasing sophistication of mascara formulas, and in particular the increasing use of so-called "waterproof" mascara based on volatile solvents for example of the type of alcohols or hydrocarbon compounds such as isododecane, there is an increasing need for bottles for mascara having good barrier properties against volatile solvents. In order to limit losses of volatile solvent by migration or evaporation through the walls of the bottle and thereby avoid drying of the mascara, it is presently necessary to wisely select the constitutive plastic material of the bottle depending on its barrier properties with respect to the volatile solvent and on its compatibility with the formulation of the mascara.

The use of certain grades of polyamides or polyester is thereby known for making mascara bottles because of their barrier properties with respect to non-polar volatile solvents. Such plastic materials are however costly.

Another known solution consists of co-extruding different layers of plastic material, for example three layers, with an intermediate layer including good barrier properties with respect to the volatile solvent, for example in EVOH, for making the mascara bottle. In addition to inducing a high cost, this multilayer co-extrusion makes the molding method complicated and not very reliable, resulting in general lower bottle quality, notably in terms of tolerance on the dimensioning of the neck or of aesthetics at the joint lines.

An object of the present invention is therefore to solve the drawbacks mentioned above and to propose another type of bottle having improved barrier properties with respect to the volatile solvent contained in the cosmetic product, while limiting the cost of the bottle thereof.

Another object of the present invention is to propose a bottle in which the step for checking the compatibility of the bottle with the cosmetic product and for checking the barrier properties may be reduced.

Another object of the present invention is to propose a bottle having both good barrier properties with respect to the volatile solvents and to water.

OBJECT OF THE INVENTION

For this purpose, the object of the invention is a bottle for cosmetic product containing at least one volatile solvent, notably for mascara, comprising an aperture and a rigid lateral wall molded in plastic material comprising an inside lateral surface in contact with said cosmetic product and an outside lateral surface on which a label is affixed, in which the label has barrier properties with respect to the volatile solvent.

The label is then used, in addition to its function of information medium or decoration, for ensuring to the lateral wall of the bottle, a good barrier property with respect to the volatile solvent. According to a preferred embodiment of the invention, this label covers the whole of said outside lateral surface so as to maximize the surface area of the lateral wall having a barrier property with respect to the volatile solvent. As mascara bottles generally have a diameter close to 17 mm for a length close to 80 mm, the lateral wall accounts for about 90% of the exchange surface area of the bottle, so that improving the barrier properties of the lateral wall amounts to strongly improving the barrier properties of the bottle on its whole.

Advantageously, it is no longer necessary to use a plastic material or a multilayer plastic structure having barrier properties with respect to the volatile solvent contained in the cosmetic product in order to form this lateral wall, the barrier with respect to the volatile solvent being ensured by the label, so that it is possible to limit the cost of material for forming the bottle. Therefore it is possible to use any, preferably low cost, plastic material, in order to form the lateral wall of a bottle intended to receive a cosmetic product containing a volatile solvent, regardless of the barrier properties with respect to the volatile solvent of this plastic material, from the moment that this plastic material is compatible with the cosmetic product.

Therefore it is possible to use high density polyethylene (HDPE) in order to form the lateral wall of a bottle intended to receive a cosmetic product containing a volatile solvent in spite of the generally poor barrier properties of HDPE with respect to volatile solvents. In addition to its reasonable price, HDPE has the advantage of being inert and therefore compatible with the compounds used in the cosmetic product formulations. Many tests of compatibilities of the cosmetic product with the bottle may therefore be avoided or reduced. Thus, HDPE further has good barrier properties with respect to water so that a bottle including an HDPE wall covered with a barrier label with respect to volatile solvents has universal barrier properties, i.e. both with respect to water and with respect to volatile solvents, and may receive any type of cosmetic product without it being necessary to be concerned about the evaporation of the cosmetic product. By good barrier properties with respect to water, is meant in the field of mascara, that water confined for 3 months at 40° C. in the tested plastic material is subject to a weight loss of less than 2%.

According to a preferred embodiment of the invention, the label includes an external decoration and/or protection layer, an intermediate barrier layer with respect to the volatile solvent and an internal adhesive layer.

The intermediate barrier layer may comprise a physical barrier such as an aluminium layer, which forms a total barrier with respect to the volatile solvents, but also with respect to water. Such a bottle therefore has universal barrier properties and enables non-evaporation of any mascara formulation stored within it.

This physical barrier may further be formed by a metallized film, for example a film covered with a coating which is deposited by physically depositing a vapor phase, more known under the name of PVD (Physical Vapor Deposition). A film covered with a fine layer of $SiO_x$ (10-100 nanometers) is perfectly suitable for this application.

The intermediate barrier layer may otherwise comprise a barrier polymer such as EVOH which forms a known barrier with respect to volatile solvents. This barrier polymer may further be selected from an acetal resin, PET, PVC, a HDPE/EVOH mixture or polyethylene having been subject to fluorination.

The adhesive layer preferably consists of the same material as the lateral wall or of a material compatible with the material of the lateral wall.

The external layer may preferably be a layer of polyethylene terephthalate (PET), polyethylene (PE) or polypropylene (PP), bearing an imprint on its face facing the intermediate layer.

When the adhesive layer consists of a polyolefin, a polyolefin (PE or PP) is advantageously used for forming the external layer so that the adhesive layer properly adheres onto the external layer when there is overlapping of the edges of the label.

According to a preferred embodiment, the bottle comprises a lateral wall and at least one end, the lateral wall and said end consisting of different plastic materials, the plastic material of said end having greater barrier properties with respect to the volatile solvent than those of the plastic material of the lateral wall. A bottle in addition to its natural wall includes two ends formed by a neck forming an aperture and a bottom opposite to this aperture. As the ends are not covered by the label, it is particularly advantageous to mold one of the two ends—or both ends—separately from the lateral wall by using a plastic material having better barrier properties with respect to the volatile solvent than those of the plastic material of the lateral wall and by bringing together the lateral wall and the end—or the ends—in order to form the bottle. The barrier properties of the bottle are then improved. The material overcost for using plastic materials having suitable barrier properties and/or the molding difficulties with such plastic materials are thus advantageously limited to said end and not to the bottle in its whole. Advantageously, the lateral wall may be injection-molded with one of the ends, while the other end including the better barrier properties is added. The added end is preferably the bottom of the bottle since the bottom of the bottle commonly includes a larger exchange surface area than the neck.

According to a preferred embodiment, the plastic material of the end has high barrier properties, so that the volatile solvent confined in this plastic material for 3 months at 40° C. undergoes a weight loss of less than 3%. Such a seal level is suitable for mascara applications.

Also, the basis of the plastic material of said end may be selected from acetal resin, PET, HDPE/EVOH mixture, polyethylene having been subject to fluorination or PVC. The HDPE/EVOH mixture is particularly appreciated for its joint barrier properties with respect to water and with respect to volatile solvents.

According to different preferred embodiments:
the plastic material of the lateral wall may further advantageously have high barrier properties with respect to water, so that the water confined in this plastic material for 3 months at 40° C. undergoes a weight loss of less than 2%; there actually exists a need for a bottle having good barrier properties both with respect to water and with respect to solvents. In order to be used as a bottle of universal use or for containing mascaras containing both volatile solvents and water;
the basis of the plastic material of the lateral wall is selected from HDPE or from polylactic acid (PLA);
the plastic material of the lateral wall is a plastic material inert with the cosmetic product, selected from PP, PE, biodegradable materials, or a mixture of PP/biodegradable material or PE/biodegradable material;
the lateral wall consists of HDPE and the bottom consists of HDPE/EVOH;
the lateral wall is injection-molded and the label is affixed on said outside lateral surface during the injection-molding of the lateral wall by a label molding technique in the mold; the fact that the label covers the surface of the lateral wall and is laid by injection-molding allows a reduction in the thickness of the lateral walls while having the same rigidity and strength characteristics as earlier; the thickness of the lateral wall, commonly comprised between 0.8 and 1 mm may then be reduced to a thickness of less than 0.8 mm, which allows reduction in the raw material cost; with label molding in the mold, it is moreover possible to obtain higher adhesion and aesthetical quality than what may be obtained with simple sizing.

Still according to another embodiment of the invention, the bottle further includes a bottom covered with a second label having barrier properties with respect to the volatile solvent. The evaporation of the volatile solvents contained in the bottle is then advantageously prevented at the lateral wall by the label covering the outside lateral surface and by the bottom by this second label.

The invention also extends to a mascara distributor, comprising:
a bottle as defined above intended for receiving mascara;
a wiper positioned in the aperture of the bottle; and
a means for closing said aperture comprising a gripping means, a rod and a means for applying mascara.

Finally, the invention also extends to a method for making a bottle for a cosmetic product including volatile solvents, notably for mascara, having at least one lateral wall portion in molded plastic material covered by a label and comprising the steps of:
providing a label having barrier properties with respect to the volatile solvents and including an outside decoration or protection layer, an intermediate barrier layer with respect to the volatile solvents and an adhesive internal layer;
inserting said label in a mold;
injecting said plastic material in the mold so as to achieve label molding in the mold.

Such manufacturing by label molding in the mold allows limitation of the number of successive operations to be carried out in order to obtain the bottle and notably the adhesive bonding of the label on the lateral wall as this is commonly carried out.

In order that such a method be economically viable, the manufacturing by label molding in the mold has however to be carried out at a high rate.

The invention will be better understood by means of the following description and of the appended figures given as a non-limiting example.

DETAILED DESCRIPTION OF THE INVENTION

Figures 1, 2, 3:
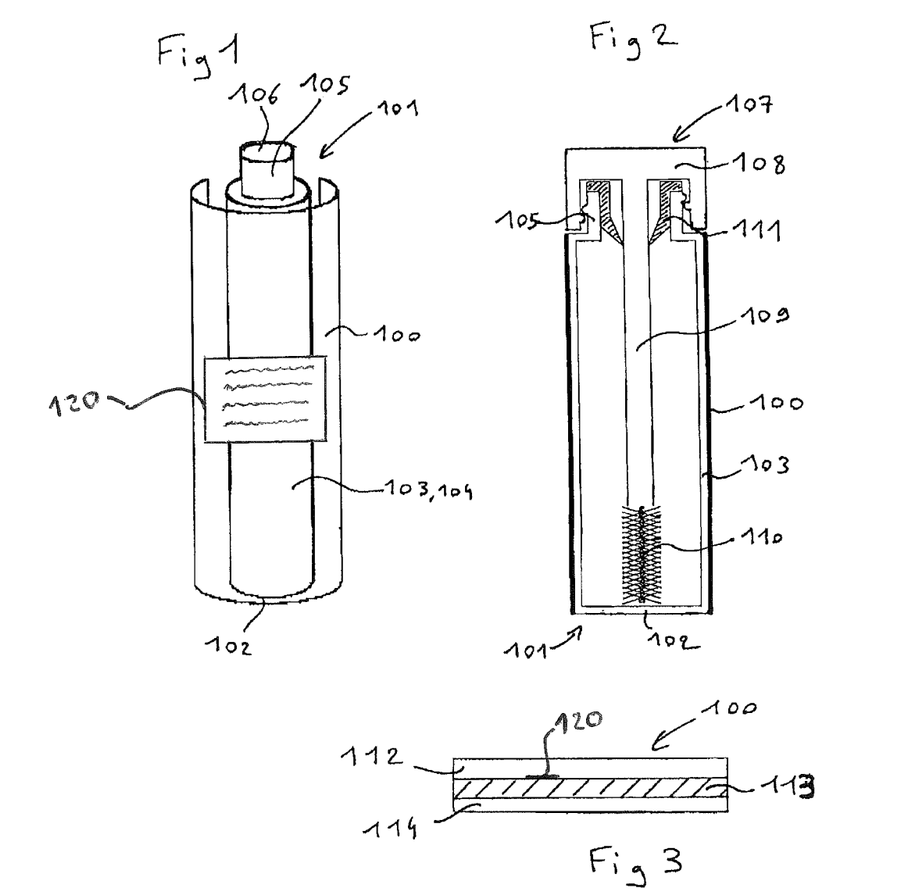
FIG. 1 illustrates in a perspective top view a bottle and a label intended to be put on the lateral surface of the bottle.
FIG. 2 is a sectional view of a mascara distributor according to the invention.
FIG. 3 schematically illustrates a label according to the invention.

A label 100 rolled around a bottle 101 intended to receive a cosmetic product and visible by transparence through the label 100 is illustrated in FIG. 1. The bottle includes a bottom 102, a lateral wall 103, the outside lateral surface of which 104 is visible, and a neck 105 including an aperture 106. The cosmetic products, and notably the mascara, increasingly include non-polar volatile solvents, notably of the alcohol or hydrocarbon type, such as isododecane. The label is further selected for its barrier properties with respect to volatile solvent(s) contained in the cosmetic products and is intended to be adhesively bonded on the outside lateral surface of bottle 101 in order to form the bottle according to the invention.

As mascara bottles generally have a diameter close to 17 mm for a length close to 80 mm, the lateral wall accounts for about 90% of the exchange surface area of the bottle, so that preventing the evaporation of the volatile solvents through this lateral wall by means of the label amounts to limiting 90% of the evaporation of the volatile solvent relatively to a standard bottle.

With the bottles according to the invention, it is possible to observe at lesser costs the requirements as regards preserving the mascara in its package, regularly set to a maximum weight loss of 3% of the volatile solvent after storage for 3 months at 40° C.

A mascara distributor according to the invention including the bottle 101 with its lateral wall 103 covered with the label 100 and a mascara applicator 107 which will be screwed onto the neck 105 for closing the aperture 106 and consisting of a gripping means 108, of a rod 109 and a means for applying the mascara 110 are illustrated in FIG. 2. A wiper 111 is further inserted into the aperture 106 of the neck 105. The label 100 advantageously covers the whole outside lateral surface 104 of the bottle 101. As shown in FIG. 1, label 100 bears imprint 120.

As visible in FIG. 3, the label includes an external decoration and/or protection layer 112, an intermediate barrier layer 113 with respect to the volatile solvent and an internal adhesive layer 114. The intermediate barrier layer 113 is preferably a layer of aluminium which forms a total barrier with respect to volatile solvents, but also with respect to water, this aluminium layer for example having a thickness from 6.5 to 65 μm and preferably from 8 to 12 μm. As shown in FIG. 3, the external layer 112 may bear an imprint 120 on its face facing the intermediate barrier layer 113.

The intermediate barrier layer may further be formed by a metallized film, for example a film covered with a $SiO_x$ coating with a thickness from 10 to 100 nanometers, deposited by physical vapor phase deposition.

The intermediate barrier layer may however also be formed by a known polymeric material for its barrier properties with respect to volatile solvents such as an EVOH layer.

The internal adhesive layer 114 is made up in the same way as the lateral wall and with a material compatible with the material of the lateral wall. A PE adhesive layer 114 is for example used when the lateral wall 103 is in HDPE. The adhesion between the label and the lateral wall is therefore very strong and there is no risk of delamination or detachment of the label, even after a long period.

The external layer is preferably a layer of polyethylene terephthalate (PET), polyethylene (PE) or polypropylene (PP), bearing an imprint on its face facing the intermediate layer. Such external layers are commonly used for decorating and protecting flexible packages. Quality decorations may be obtained on such external layers by flexography or photogravure which provides vast opportunities in terms of coloration or fineness.

The bottle 101 is advantageously molded in HDPE because HDPE has a reasonable price and is inert and therefore compatible with the compounds used in cosmetic product formulations. HDPE further has good barrier properties with respect to water so that a bottle including a HDPE wall covered with a barrier label with respect to volatile solvents has universal barrier properties, i.e. both with respect to water and with respect to volatile solvents, and may receive any type of cosmetic products without it being necessary to be concerned about the evaporation of the cosmetic product. By good barrier properties with respect to water, is meant in the field of mascara, that water confined for 3 months at 40° C. in the tested plastic material undergoes a maximum weight loss of 2%.

The bottle 101 may also be molded in polylactic acid (PLA) appreciable for its biodegradability properties and for its compatibility with volatile solvents.

Other plastic materials may also be used in cosmetics for molding the bottle 101 after determining their compatibility with the cosmetic product such as for example PP, PE, biodegradable materials such as for example polyhydroxyalkanoate (PHA), polyhydroxybutyrate (PHB), polyhydroxyvalerate (PHV), starch derivatives, succinic acid derivatives, PP/biodegradable material mixtures and PE/biodegradable material mixtures.

Tests were conducted in order to demonstrate the seal of the bottle 101 according to the invention. Cylindrical HDPE bottles (product reference MG9601 of Borealis) with a height of 77 mm for a diameter of 15 mm were filled with 5 ml of water or 5 mL of isododecane, sealed hermetically, and then subject to a temperature of 40° C. for 3 months. The water and isododecane weight losses were 0.8% and 9.9%, respectively. The same bottles with the outside lateral surface covered by a label including an aluminium layer were subject to the same experiment and the water and isododecane weight losses were 0.1% and 1.9%, respectively. Water and isododecane evaporation was strongly reduced with this bottle according to the invention. Such a bottle according to the invention may therefore be used without any modification in order to receive as required, a mascara based on water or a mascara based on isododecane.

In order to further improve the barrier properties of the bottle with respect to a volatile solvent without modifying the advantageously economical and practical constitution of the lateral wall 103, it is contemplated to additionally act on the barrier properties of the sole portions of the bottle 101 not covered by the label 100, i.e. the neck 105 and/or on the bottom 102, further defined by the term of ends.

Figure 4:
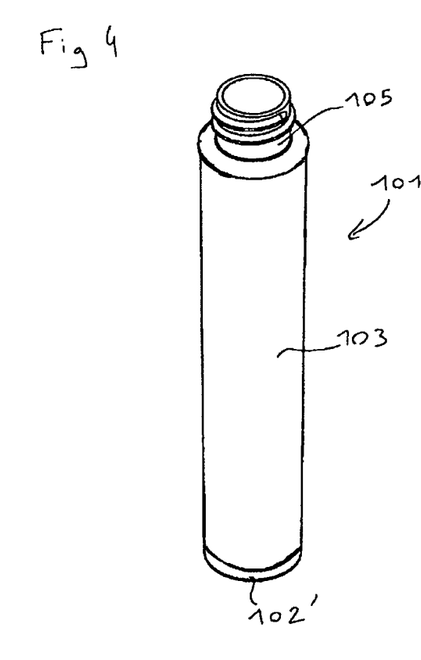
FIG. 4 illustrates in a top perspective view, a bottle including a bottom added onto the lateral wall.
Figure 5:
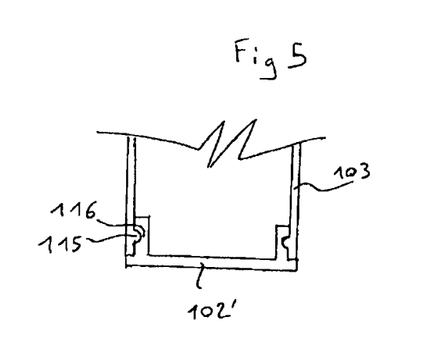
FIG. 5 is a sectional view of a portion of the bottle of FIG. 4 and schematically illustrates a means for assembling the bottom on the lateral wall.
Figure 6:
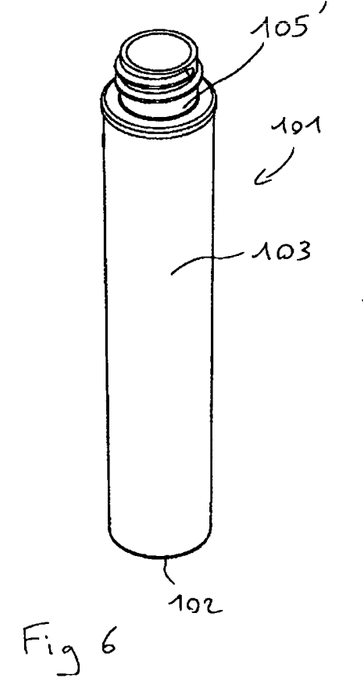
FIG. 6 illustrates in a top perspective view, a bottle including a neck added onto the lateral wall.
Figure 7:
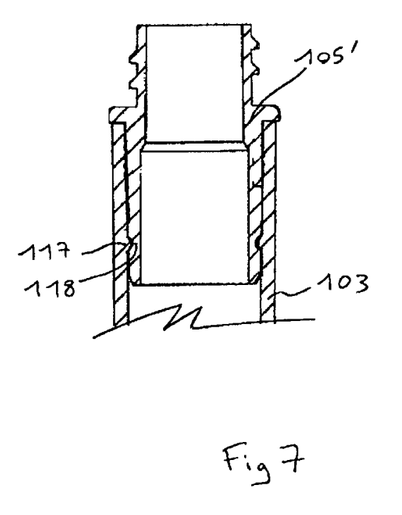
FIG. 7 is a sectional view of a portion of the bottle of FIG. 6 and schematically illustrates a means for assembling the neck on the lateral wall.
Figure 8:
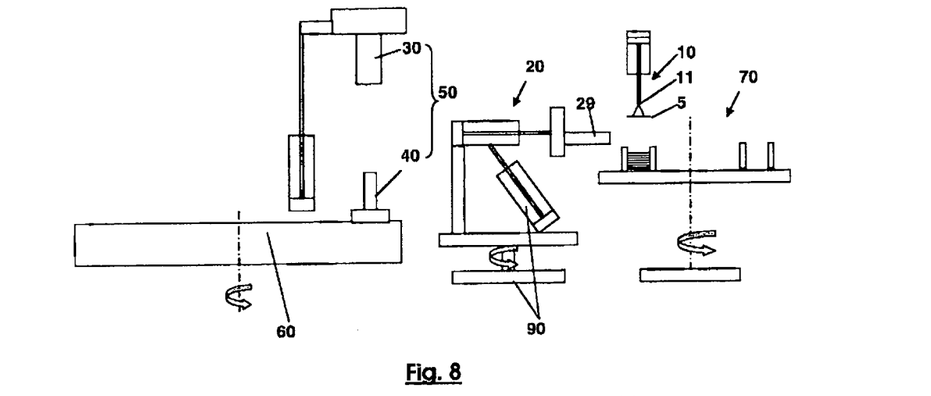
FIG. 8 schematically illustrates a machine by means of which the bottle according to the invention may be manufactured.
Figure 9:
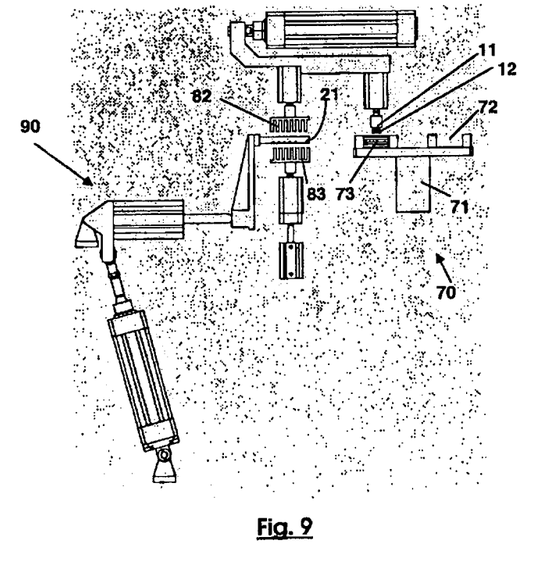
FIG. 9 illustrates in a front view the devices placed at a station for affixing labels of a particular machine.
Figure 10:
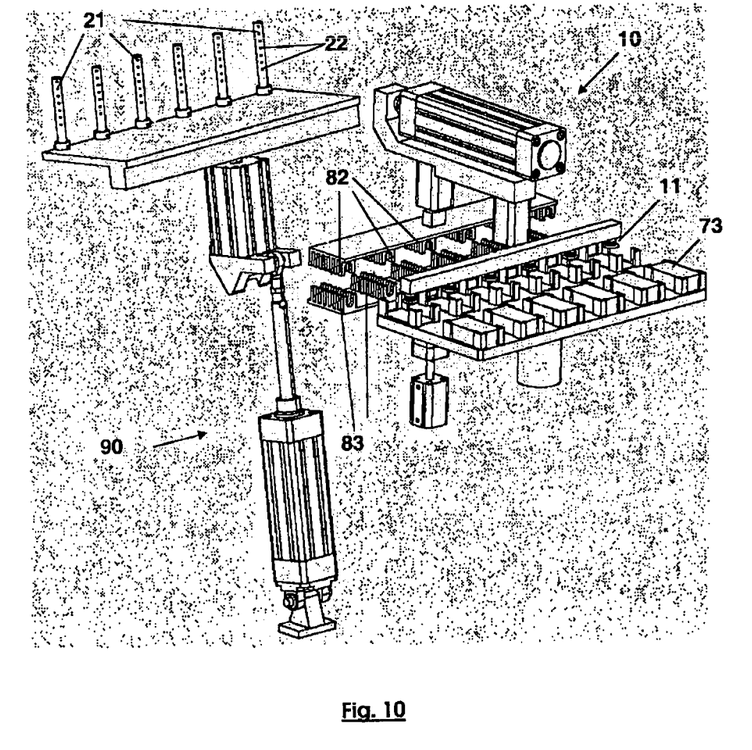
FIG. 10 illustrates in a perspective view, the device of FIG. 8, the transfer means this time being in a position for introducing the labels into imprints of matrices.
Figure 11:
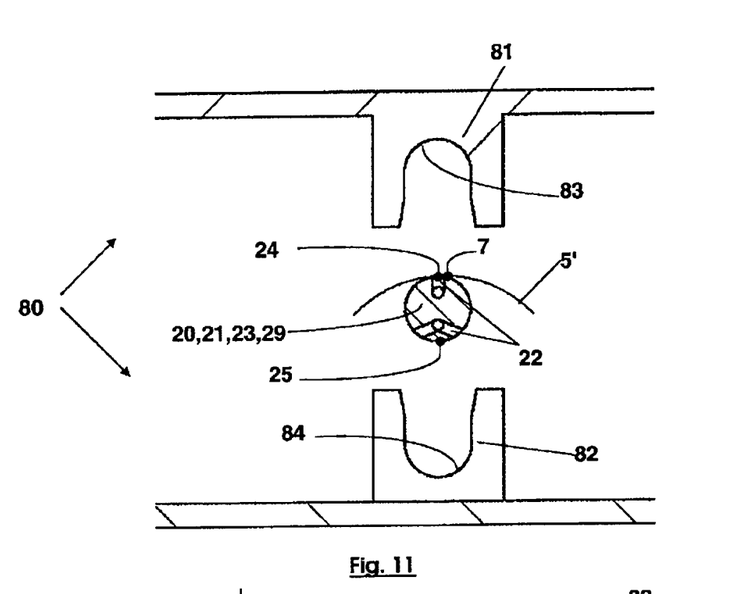
FIG. 11 schematically illustrates the vicinity of a mandrel used for transferring the label from a storage area towards the molding cavity, very shortly before the label is conformed around the mandrel.
Figure 12A:
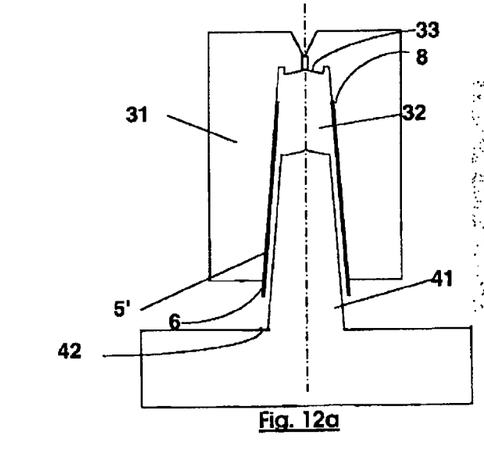
FIG. 12a schematically illustrates a molding assembly intended for making a substantially flat bottom and a lateral wall after depositing a label in the imprint of the matrix.
Figure 12B:
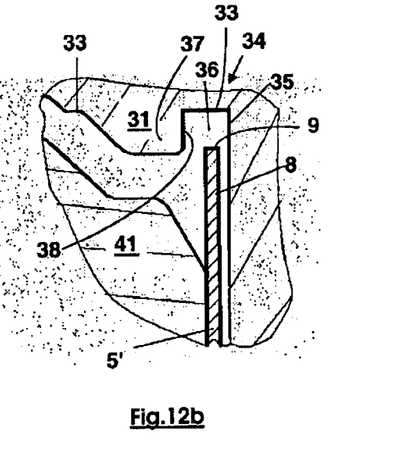
FIG. 12b details the diagram of FIG. 12a in the peripheral portion of the imprint which is found in the vicinity of the connection between said bottom and said lateral wall.

Thus, two other advantageous embodiments according to the invention are shown in FIGS. 4, 5 and in FIGS. 6, 7, respectively.

As visible in FIGS. 4 and 5 which show the bottle 101 without the label 100 for the sake of clarity, the bottle 101 includes a bottom 102' added on an aperture at the base of the lateral wall 103; i.e. the bottom of the bottle is formed by a distinct element 102' which has not been molded with the lateral wall 103. The bottom 102' is attached to the base of the lateral wall 103 for example by snapping a ridge 115 formed on the lateral wall 103 onto a groove 116 formed on a tab of the bottom 102'. The attachment should provide a perfect seal. Other attachment means may of course be used, such as adhesive bonding, welding, screwing . . . .

The bottom 102' was molded in a plastic material having good barrier properties with respect to the volatile solvent of the cosmetic product and more particularly in a plastic material different from the plastic material of the lateral wall and having higher barrier properties with respect to the volatile solvent than those of the plastic material of the lateral wall.

The plastic material of the bottom 102' has high barrier properties, so that the volatile solvent confined in this plastic material for 3 months at 40° C. undergoes a weight loss of less than 3%.

The plastic material of the bottom 102' is more particularly selected from acetal resin, PET, a HDPE/EVOH mixture or polyethylene having undergone fluorination and PVC.

By preventing the evaporation of the volatile solvent through the lateral wall 103 by means of the label 100 and through the bottom 102' by selecting a suitable material, a bottle is obtained which is perfectly adapted to the requirements in the field of cosmetic products and more particularly in the field of mascara.

According to a preferred embodiment of the invention, the bottom 102' consists of a HDPE/EVOH mixture, the lateral wall 103 consists of HDPE and the label 100 includes an aluminium layer.

As visible in FIGS. 6 and 7 which show the bottle 101 without a label 100 for the sake of clarity, the bottle 101 includes a neck 105' added onto an aperture at the top of the lateral wall 103; i.e. the neck of the bottle is formed by a distinct element 105' which has not been molded with the lateral wall 103. The neck 105' is attached to the lateral wall 103, for example by snapping a ridge 117 formed on the lateral wall 103 onto a groove 118 formed on the neck 105'. The attachment should provide a perfect seal. Other attachment means may of course be used, such as adhesive bonding, welding, screwing . . . .

The neck 105' was molded in a plastic material having good barrier properties with respect to the volatile solvent of the cosmetic product and more particularly in a plastic material different from the plastic material of the lateral wall 103 and having higher barrier properties with respect to the volatile solvent than those of the plastic material of the lateral wall 103.

The plastic material of the neck 105' has high barrier properties, so that the volatile solvent confined in this plastic material for 3 months at 40° C., undergoes a weight loss of less than 3%.

The plastic material of the neck 105' is more particularly selected from acetal resin, PET, HDPE/EVOH mixture or polyethylene having undergone fluorination and PVC.

By preventing the evaporation of the volatile solvent through the lateral wall 103 by means of the label 100 and through the neck 105' by selecting a suitable material, a bottle is obtained which is perfectly adapted to the requirements in the field of cosmetic products and more particularly in the field of mascara.

According to a preferred embodiment of the invention, the neck 105' consists of a HDPE/EVOH mixture, the lateral wall 103 consists of HDPE and the label 100 includes an aluminium layer.

Of course, for greater efficiency, it is also possible to add both a neck 105' and a bottom 102' on a lateral wall 103 covered with a label 100.

We shall discuss hereafter as an example a particularly advantageous method for making the product according to the invention, and more particularly the bottle 101 illustrated by FIGS. 6 and 7.

In fields other than that of mascara bottles, bodies in plastic material are known for which the outer surface is provided with a label. These labels may be applied on the outer surface by means of so-called "in-mold labeling" (IML) method but which we shall prefer to subsequently designate by label molding in the mold. It is particularly interesting for making bottles in plastic material, having a lateral wall covered by a label, said lateral wall extending along an axisymmetrical surface with a perpendicular axis, such as cylinder or a frustum, to the plane of the bottom. It is intended even more particularly for containers or bottles, the dimensions of which are relatively small, i.e. with a diameter comprised between 13 and 60 mm and a height comprised between 40 and 200 mm and the lateral wall of which is entirely covered or almost entirely covered by said label.

The molding is carried out by injecting plastic material into a mold including at least two portions movable relatively to each other, which, by bringing them closer to each other, allows a molding cavity to be made and which by moving them away from each other allows the molded part to be ejected. For more specifically targeted axisymmetrical bottles, the mold comprises a female portion or die, including at least one hollow imprint corresponding to the external shape of the bottle, and a male portion or punch, including at least one raised imprint corresponding to the internal face of said bottle.

In order to make the present invention economically viable by using a label molding technique in the mold, it is possible to use a manufacturing method with which a manufacturing cycle time for such bottles, as short as possible, may be ensured. Moreover it is interesting that this method may repeatedly ensure accurate positioning of the label, in particular when the latter has to entirely cover the lateral wall of the bottle.

For this, it is possible to use, as a non-limiting example, the manufacturing method described below and illustrated by FIGS. 7-12b.

In order to mold mascara bottles having a substantially flat bottom and an asymmetrical or quasi-cylindrical lateral wall entirely covered with a label, a machine is used which comprises:
- an indexed rotary plate 60 operating stepwise and subdivided into six sectors for serving six work stations. On this plate are mounted in each of the six sectors, six molding assemblies 50, each comprising six dies 31, grouped in a die-holder assembly 30 and six punches 41 grouped in a punch-holder assembly 40; the punches and the dies appear here as a rake, aligned so that their axes are parallel to each other and equidistant;
- an injection press (not shown), placed on one of the work stations of the rotary plate,
- a device for affixing labels located upstream from the injection press, schematized in FIG. 1 and detailed in FIGS. 2 and 3, comprising six interdependent mandrels 21 and placed as a rake with a distance between their axes identical to that of the dies and of the punches, each acting as a means 20 for transferring the labels, driven by a first actuator 90, which in fact is an assembly of actuator cylinders and rotary motors allowing the mandrels 21 to be presented substantially horizontally so that they receive the labels 5 and the latter to be presented substantially vertically so that they may be introduced, provided with their labels, inside the imprints 32 of the dies 31, the molding assembly 50 being opened at said station for affixing the labels, so that said labels may be deposited in said imprints.

Supply of labels is ensured by a rotary table 71 comprising two diametrically opposite magazines 72 and 73, one (72) ready to be filled, the other one (73) comprising six stacks of labels is placed under six cylinders with suction cups 11, each acting as a means 10 for picking up labels. The whole of the suction cup cylinders 11 may be displaced above an area where the mandrels 21 actuated by the actuator 90, are placed horizontally so as to each receive a label 5'.

The labels 5' have been cut out in a multilayer flexible sheet in plastic material, comprising an external layer printed in four colors by flexography and an aluminium layer forming a barrier with respect to diffusion of gases. They have larger width, of the order of 1 mm at the circumference of the lateral wall of the bottle to be made. They have greater length of the order of 1 mm, at the height of the lateral wall of the bottle to be made.

The labels 5' are presented in such a way that they arrive slightly unbalanced on their mandrels 21: their middle axis 7 forms with the upper generatrix 24 of the associated mandrel an angle close to 10° (measured in a plane perpendicular to the axis of the mandrel).

The mandrels 21 are cylindrical with sections of 0.5 mm smaller diameters than those of the dies. Each mandrel 21 is provided with channels 22 opening onto its surface and in which air may be sucked up or blown.

While sucking up air through the channels 22 of the mandrels 21, the labels 5' are released from the suction cups 11 and the latter will rest on the upper generatrix 24 of the mandrels 21 placed horizontally. In order to conform the labels 5' on the mandrels 21, 6 upper half-shells 83 also arranged as a rake, which apply the labels against the upper portion of the mandrels, are moved down. The shaping of the label is continued by moving up the 6 lower half-shells 83. During this upward movement, for each label, the edges follow the wall of the hollow surface 84 of the lower half-shells 83 until they overlap by over about 1 mm. The final geometrical configuration of the thereby conformed label is such that the edges or any other portion of the label do not touch the wall of the imprint of the die, during the introduction of the mandrel into the imprint of the die.

The half-shells are removed while maintaining suction of air through the mandrels 21. By means of the first actuator 90, the mandrels 21 are displaced towards the rotary plate and the 6 molding assemblies 50 maintained in the open position. The six mandrels 31 are introduced into the six imprints 32 of the dies 31 while maintaining sufficient suction power so that the labels are maintained conformed in this way.

Each mandrel 21 is provided with three rows of opening channels 22, one row aligned on the upper generatrix 24 of the mandrel and two rows aligned along the symmetrical generatrices relatively to the vertical diametrical plane of said mandrel, the closest edge of the orifices being located at a distance close to 3 mm from the lower generatrix 25. The orifices are regularly positioned on said generatrices, at a distance close to 3 mm from each other. By sucking up air with a negative pressure of the order of 4-5 bars, one manages to maintain said flattened labels on their mandrels and to introduce the latter inside the imprints of the dies without there being any collision.

When the mandrels 21 have penetrated into the imprints 32 to a predetermined depth, the airflow direction is reversed in the channels 22 of the mandrels 21 so that the labels unroll and their edges come into contact with the lateral walls of imprints 32.

The predetermined penetration depth of the mandrels into the imprints is defined so that, when the latter is reached, the ends of the labels extend beyond the imprints of the dies by a distance close to 1 mm.

The punches 41 have a lateral surface which is provided at the base of a shoulder 42 forming a joint plane with the associated die 31. The shoulder is placed at a distance such that when the punch 41 and the matrix 31 are brought closer together, the jutting-out end 6 of the label 5' comes into abutment against said shoulder 42 and is driven by the latter towards the bottom 33 of the die 31 until it occupies it final position.

When the punch 41 and the die 31 are side-by-side in order to form the molding cavity, the second end 8 of the label juts out from the punch 41 into the molding cavity. The peripheral portion 34 of the imprint has the following shape:
- at the periphery, the lateral wall 35 of the imprint facing the punch 41 remains substantially axial;
- when the die 31 and the punch 41 are in contact with each other, the bottom 33 of the imprint 32 of the die 31 being at right angles to the lateral wall is at a greater depth than the jutting-out height of the second end 8 of the label, so that said end does not come into abutment on the bottom of said die imprint and that, during the injection, the plastic material injected in a point located close to the axis, has to flow radially in an annular peripheral area 36 located above the apical slice of said end portion;

the bottom of the die has an annular boss 37 which is an obstacle to the flow of the plastic material towards said annular peripheral area 36, the outside edge 38 of said annular boss 37 and the inside edge of the second end being distant from each other by a value smaller than the average thickness of said bottom.

The molding assemblies are then closed and locked and the rotary plate rotates so that the molding assemblies arrive at the molding station. Downstream, two stations are dedicated to cooling the thereby molded elements and a station is dedicated to ejecting the molded elements after the molding devices have been opened. A maneuvering device ensuring the opening, closing and locking of the mobile portions of the molding assemblies is placed in each sector of the rotary plate, associated with six punches and with six dies. Thus, this operation may be performed concurrently independently of the immobilization time at each station.

With such a machine, mascara containers for which the lateral wall comprised between 0.6 and 1.5 mm is entirely covered with a label are easily made at a clearly higher rate relative to standard injection.

Still according to another advantageous embodiment of the bottle, the bottom 102 of the bottle 101 of FIG. 1 may further be covered with a second label having barrier properties with respect to the volatile solvent. The bottom generally forming an outside planar surface, the attachment of the second label onto the bottom may be carried out in a simple way. The evaporation of the volatile solvents contained in the bottle 101 is then advantageously prevented at the lateral wall 103 by the label 100 covering the outside lateral surface 104 and through the bottom 102 by this second label. This second label for example has physical characteristics and properties identical with those of the label 100. The bottom 102 as for it, may have physical characteristics identical with those of the lateral wall.

The bottom 102 and the lateral wall 103 may for example have been molded together with the label 100 as the second label. The label 100 and the second label may form a single label or two distinct labels.

The label 102 and the lateral wall 103 may further have been molded together only with the label 100. The second label may then be adhesively bonded subsequently, for example during the filling of the bottle in order to reference the bottle.

The lateral wall 103 may further be molded with the label 100 separately from the bottom which is molded with the second label, and then the bottom 102 added onto the lateral wall 103.

The invention claimed is:

1. A bottle for a cosmetic product containing at least one volatile solvent, notably for mascara, comprising an aperture and a rigid lateral wall molded in a plastic material comprising an inside lateral surface in contact with said cosmetic product and an outside lateral surface on which a label is affixed, characterized in that said label has barrier properties with respect to the volatile solvent, wherein the label includes an outside decoration and/or protection layer, an intermediate barrier layer with respect to the volatile solvent and an internal adhesive layer, and wherein the outside layer comprises polyethylene terephthalate (PET), polyethylene (PE), or polypropylene (PP), and bears an imprint on its face facing the intermediate layer.

2. The bottle according to claim 1, wherein the label covers the whole of said outside lateral surface.

3. The bottle according to claim 1, wherein the intermediate barrier layer comprises a physical barrier.

4. The bottle according to claim 3, wherein the physical barrier is an aluminium layer.

5. The bottle according to claim 1, wherein the intermediate barrier layer comprises a barrier polymer.

6. The bottle according to claim 5, wherein the barrier polymer is selected from acetal resin, PET, PVC, a HDPE/EVOH mixture, polyethylene having undergone fluorination, and EVOH.

7. The bottle according to claim 3, wherein the physical barrier comprises a metallized film.

8. The bottle according to claim 7, wherein the metallized film is a film covered with a coating deposited by physical vapor phase deposition (VPD) notably in $SiO_x$.

9. The bottle according to claim 1, wherein the adhesive layer consists of the same material as the lateral wall or of a material compatible with the material of the lateral wall.

10. The bottle according to claim 1, comprising at least one end, wherein the lateral wall and said end consist of different plastic materials, the plastic material of said end having higher barrier properties with respect to the volatile solvent than those of the plastic material of the lateral wall.

11. The bottle according to claim 10, wherein said end forms the bottom of the bottle.

12. The bottle according to claim 10, wherein the plastic material of the end has high barrier properties so that a volatile solvent confined in such a plastic material for 3 months at 40° C. undergoes a weight loss of less than 3%.

13. The bottle according to claim 10, wherein the base of the plastic material of said end is selected from acetal resin, PET, a HDPE/EVOH mixture, polyethylene having undergone fluorination, and PVC.

14. The bottle according to claim 1, wherein the plastic material of the lateral wall has high barrier properties with respect to water, so that the water confined in such a plastic material for 3 months at 40° C. undergoes a weight loss of less than 2%.

15. The bottle according to claim 1, wherein the base of the plastic material of the lateral wall is HDPE or polylactic acid (PLA).

16. The bottle according to claim 1, wherein the plastic material of the lateral wall is a plastic material, inert with the cosmetic product, selected from PP, PE, biodegradable materials or a PP/biodegradable material or PE/biodegradable material mixture.

17. The bottle according to claim 11, wherein the lateral wall consists of HDPE and wherein the bottom consists of HDPE/EVOH.

18. The bottle according to claim 1, wherein the lateral wall is molded by injection and wherein said label is affixed on said outside lateral surface during injection-molding of said lateral wall by a technique for label molding in the mold.

19. The bottle according to claim 1, further including a bottom covered with a second label having barrier properties with respect to the volatile solvent.

20. A mascara distributor, comprising:
a bottle according to claim 1, intended to receive mascara;
a wiper positioned in the opening of the bottle; and
a means for closing said aperture comprising a gripping means, a rod and a means for applying mascara.

21. A method for making a bottle for a cosmetic product including a volatile solvent, notably for mascara, wherein the bottle comprises an aperture and a rigid lateral wall molded in a plastic material comprising an inside lateral surface in contact with said cosmetic product and an outside lateral surface on which a label is affixed, characterized in that said label has barrier properties with respect to the volatile solvent, wherein the label includes an outside decoration or protection layer, an intermediate barrier layer with respect to the volatile solvent and an internal adhesive layer, and wherein the outside layer comprises polyethylene terephthalate (PET), polyethylene (PE), or polypropylene (PP), and bears an imprint on its face facing the intermediate layer characterized in that said method comprises the steps of:
providing said label;
inserting said label in a mold; and
injecting said plastic material in the mold so as to produce label molding in the mold.

22. The method of claim 21, wherein the bottle for a cosmetic product has a height between 40 and 80 mm.

23. A bottle for a cosmetic product containing at least one volatile solvent, notably for mascara, comprising an aperture and a rigid lateral wall molded in a plastic material comprising an inside lateral surface in contact with said cosmetic product and an outside lateral surface on which a label is affixed, characterized in that said label has barrier properties with respect to the volatile solvent, the bottle further comprising at least one end, wherein the lateral wall and said end consist of different plastic materials, the plastic material of said end having higher barrier properties with respect to the volatile solvent than those of the plastic material of the lateral wall, wherein said end forms the bottom of the bottle, and wherein the lateral wall consists of HDPE and the bottom consists of HDPE/EVOH.

24. The bottle according to claim 23, wherein the label covers the whole of said outside lateral surface.

25. The bottle according to claim 23, wherein the plastic material of the end has high barrier properties so that a volatile solvent confined in such a plastic material for 3 months at 40° C. undergoes a weight loss of less than 3%.

26. The bottle according to claim 23, wherein the plastic material of the lateral wall has high barrier properties with respect to water, so that the water confined in such a plastic material for 3 months at 40° C. undergoes a weight loss of less than 2%.

27. The bottle according to claim 23, wherein the lateral wall is molded by injection and wherein said label is affixed on said outside lateral surface during injection-molding of said lateral wall by a technique for label molding in the mold.

28. The bottle according to claim 23, wherein the bottom is covered with a second label having barrier properties with respect to the volatile solvent.

29. A mascara distributor, comprising:
a bottle according to claim 23, intended to receive mascara;
a wiper positioned in the opening of the bottle; and
a means for closing said aperture comprising a gripping means, a rod and a means for applying mascara.

30. A method for making a bottle for a cosmetic product including a volatile solvent, notably for mascara,
wherein the bottle comprises
an aperture and a rigid lateral wall molded in a plastic material comprising an inside lateral surface in contact with said cosmetic product and an outside lateral surface on which a label is affixed, characterized in that said label has barrier properties with respect to the volatile solvent,
the bottle further comprising at least one end, wherein the lateral wall and said end consist of different plastic materials, the plastic material of said end having higher barrier properties with respect to the volatile solvent than those of the plastic material of the lateral wall,
wherein said end forms the bottom of the bottle, and
wherein the lateral wall consists of HDPE and the bottom consists of HDPE/EVOH
characterized in that said method comprises the steps of:
providing said label, the label including an external decoration or protection layer, an intermediate barrier layer towards the volatile solvent and an internal adhesive layer;
inserting said label in a mold; and
injecting said plastic material in the mold so as to produce label molding in the mold.

31. The method of claim 30, wherein the bottle for a cosmetic product has a height between 40 and 80 mm.

* * * * *